United States Patent Office 3,242,139
Patented Mar. 22, 1966

---

3,242,139
POLYURETHANE COMPOSITIONS BASED ON 3,11-DIOXA-5,7,9-TRINITRAZA-1,13-TRIDECANEDIOL
Claude G. Long, Bartlesville, Okla., and George D. Sammons and Charles H. Burnside, Waco, Tex., assignors to Phillips Petroleum Company, a corporation of Delaware
No Drawing. Filed Jan. 25, 1960, Ser. No. 4,574
9 Claims. (Cl. 260—77.5)

This invention relates to nitramine polyurethane compositions. In one aspect this invention relates to composite type propellant compositions wherein the binder component comprises said nitramine polyurethane compositions.

In recent years, great interest has developed in solid propellants for jet propulsion devices such as missiles, rocket motors, gas generators, and the like. One type of solid propellant which has received considerable attention is that of the composite type, a typical composite propellant being one that uses an organic material as the fuel and binder, and a solid oxidant such as ammonium perchlorate or ammonium nitrate. In this type of propellant, particularly when the propellant comprises a major proportion of a crystalline oxidizer component and a minor proportion of a fuel or binder component, the problem is presented of adjusting the physical properties of the propellant because of the small proportion of the binder material. Thus, it is difficult to provide suitable adhesion to the particles of oxidizer and the matrix of binder material is so tenuous that it is difficult to provide sufficient strength and elasticity in the propellant structure. Also, in many cases it is desirable and necessary to be able to cast or pour the propellant into a rocket case or mold and then cure same to a solid having suitable properties. In addition, since the binder component also forms a fuel, or part of the fuel, it must have suitable chemical properties for this purpose.

In the usual type of solid composite type rocket propellants, all of the structural strength is attributable to the binder, which at the same time serves as the fuel component. In such propellants, in order to obtain the proper combustion characteristics, the proportion of crystalline oxidizer component is very high, usually from 85 to 95 weight percent of the total propellant composition, leaving only 5 to 15 weight percent binder component. The result is that obtaining proper tensile strength and elongation presents serious problems and said properties are generally deficient.

We have discovered a new nitramine polyurethane composition which, when used as the principal ingredient of the binder component, eliminates or mitigates the above described difficulties. When using our new nitramine polyurethane composition, as much as 20 to 60 percent can be used in the binder component without sacrificing the high energy release which is necessary to obtain a high specific impulse in rocket systems. The use of such high proportions of binder component is made possible by the large amount of oxidizer material which is available from the nitramine group present in the molecule of the polyurethane itself. The oxygen-fuel balance within the binder material is usually not adequate however, so that an inorganic oxidizer is still required. However, the mechanical problems in our new propellant compositions are much less than, and the physical properties of our new propellant compositions are much superior to those in the propellant compositions of the prior art.

Thus, broadly speaking, the present invention resides in a new nitramine polyurethane composition (described further hereinafter), and in propellant compositions wherein the binder component comprises said nitramine polyurethane composition.

An object of this invention is to provide a new nitramine polyurethane composition. Another object of this invention is to provide a new propellant composition wherein the binder component comprises said nitramine polyurethane composition. Another object of this invention is to provide a propellant composition having improved physical properties. Another object of this invention is to provide a propellant composition of the composite type wherein an increased proportion of binder component is utilized without sacrificing physical properties or ballistic properties. Another object of this invention is to provide a method of developing thrust by burning said new propellant composition in a rocket motor. Other aspects, objects and advantages of the invention will be apparent to those skilled in the art in view of this disclosure.

Thus, according to the invention, there is provided a composition of matter comprising an organic polyisocyanate and 3,11-dioxa-5,7,9-trinitrazatridecane-1,13-diol, said polyisocyanate being present in an amount within the range of from about 0.9 to about 1.8 chemical equivalents based on isocyanate groups therein per chemical equivalent of said diol based on hydroxyl groups therein.

Further according to the invention there is provided a new propellant composition wherein the binder component comprises said new nitramine polyurethane composition.

Still further according to the invention there is provided a method for developing thrust which comprises the step of burning said new propellant composition in a rocket motor.

As indicated above the nitramine polyurethane compositions of the invention are prepared by the interaction of an organic polyisocyanate with a linear methylene nitramine diol, more specifically, 3,11-dioxa-5,7,9-trinitrazadecanel-1,13-diol.

While organic polyisocyanates in general can be used in the practice of the invention, the diisocyanates are usually preferred because of their availability and ease of preparation. Said polyisocyanates should be liquid under the conditions of use. Representative polyisocyanates which can be used in the practice of the invention, include, among others, those given in Table I below.

TABLE I

Toluene-2,4-diisocyanate
Toluene-2,3-diisocyanate
Toluene-2,5-diisocyanate
Toluene-2,6-diisocyanate
Commercial mixtures of 2,4- and 2,6-toluene diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Benzene-1,3-diisocyanate
Benzene-1,4-diisocyanate
Benzene-1,2,-4-triisocyanate
Toluen-2,4,6-triisocyanate
Benzene-1,3,5-triisocyanate
Benzene-1,2,3-triisocyanate
Toluene-2,3,4-triisocyanate
Polybenzylene polyisocyanate The above are defined as polyisocyanate substituted hydrocarbons.

Said 3,11-dioxa-5,7,9-trinitrazatridecane-1,13-diol, referred to hereinafter for convenience as GSXEG, is prepared by the reaction of 1,7-dichloro-2,4,6-trinitrazaheptane, referred to hereinafter as GSX, with ethylene glycol. Said GSX is prepared by the reaction of 1,7-diacetoxy-2,4,6-trinitrazaheptane, referred to hereinafter as BSX, with hydrogen chloride. Said BSX is prepared by reacting nitric acid, acetic anhydride, and hexamethylenetetramine.

An example of the preparation of said BSX is as follows: 90 milliliters (2.15 mols) of 98–100 percent nitric acid is added carefully to 240 milliliters (2.35 mols) of acetic anhydride while stirring and cooling to 5–15° C. A solution of 66.8 grams (0.48 mol) of hexamethylenetetramine in 110 milliliters (1.93 mols) of acetic acid is then added while maintaining the temperature between 10 and 20° C. The mixture is then heated to 75° C. for 15 minutes, cooled as rapidly as possible to 60° C., and then allowed to cool overnight to room temperature. The precipitate is filtered off and washed with 20 milliliters of acetic acid. The product is recrystallized (without drying) from 250 milliliters of acetic acid, washed with 20 milliliters of methanol, then slurried with 100 milliliters of hot methanol, and then air dried. Yields in the order of 64 percent of theoretical, based on one mol per mol of hexamethylenetetramine, and having a melting point in the order of 155.0 to 155.5° C. are obtained by this procedure.

An example of the preparation of said GSX is as follows: 500 grams of BSX, 1250 milliliters of ethylene dichloride, and 235 grams of dry HCl are charged to a two-quart Hastelloy lined autoclave equipped with a 500 r.p.m. propeller type stirrer. The mixture in said autoclave is heated at 120° C. (250 p.s.i.g. maximum pressure) for 30 minutes. The mixture is then cooled by means of water circulating in a jacket surrounding the autoclave, the excess HCl is vented off, and crude GSX is crystallized out by chilling at 0° C. for two days. After washing twice with diethylether the yield of crude GSX is 378.8 grams and has a melting point of from 141–149° C.

An example of the preparation of said GSXEG is as follows. Crude GSX is dissolved in ethylene glycol at 65° C. and the temperature maintained at 65° C. for one hour. The reaction mixture is then poured into an equivalent volume of isopropanol and cooled to −16° C. for 48 hours. The product is filtered and recrystallized from isopropanol to give a 72–78 percent yield of the pure diol having a melting point of 94 to 96° C.

The synthesis steps for the above compounds are shown below:

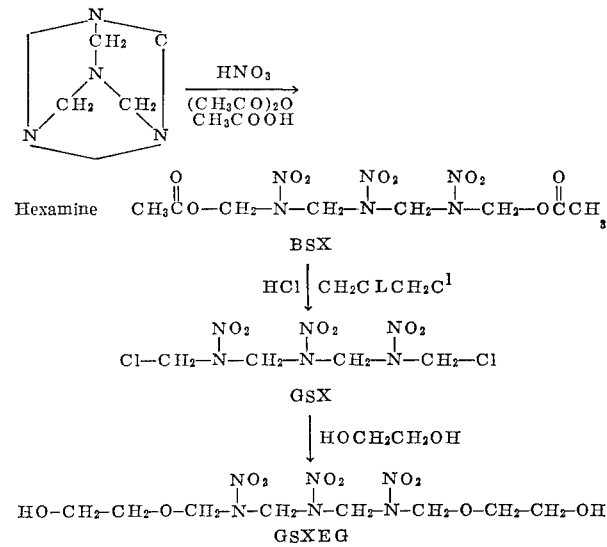

If desired a crosslinking agent can be used in preparing the nitramine polyurethane compositions of the invention. Said crosslinking agent serves to form crosslinks between molecules of the polyurethane, and also reacts with the organic polyisocyanate. When said nitramine polyurethanes are to be used as the principal ingredient in the binder components of the propellant compositions of the invention, it is usually preferred to use a crosslinking agent. Suitable crosslinking agents for use in the practice of the invention are the primary and secondary polyhydroxy compounds of the formula $R(OH)_n$ where R is a saturated acyclic hydrocarbon radical containing from 3 to 6 carbon atoms, and $n$ is an integer of from 3 to 6. Examples of said crosslinking agents include, among others, the following: 1,2,3-propanetriol (glycerol); 1,2,6-hexanetriol; 1,1,1-trimethylolpropane; erythritol; pentaerythritol, ribitol; xylitol; sorbitol; and mannitol.

The actual composition in weight percent of the nitramine polyurethane compositions of the invention will, of course, depend upon the specific ingredients used in preparing the composition. However, it will always be based on the chemical equivalents of the diol (GSXEG) present in the composition. Table II given below sets forth a general formulation which can be used as a guide in preparing the nitramine polyurethane compositions of the invention.

TABLE II

| Ingredients: | Chemical equivalents* |
|---|---|
| Nitramine diol | 1 |
| Polyisocyanate | 0.9–1.8 |
| Polyhydroxy compound (cross linking agent) | 0–0.6 |

*To convert to parts by weight, multiply by the equivalent weights (molecular weight divided by the number of active hydrogen atoms (OH groups) or the number of isocyanate groups in the molecule) of the individual compounds making up the composition. To convert parts by weight to weight percent divide the individual parts by weight by the total parts by weight and multiply by 100. In the event commercial compounds are used, it may be necessary to determine the equivalent weight experimentally.

In preparing the nitramine polyurethane compositions of the invention, the reaction conditions are in general those known to persons skilled in the art for the preparation of conventional polyurethanes. Any suitable mixing technique for bringing the reactants together can be employed. For example, the nitramine diol (GSXEG), the crosslinking agent (when used), and the polyisocyanate are placed in a suitable mixer such as a Baker-Perkins mixer, and mixed for about 1 to about 10 minutes at a temperature sufficient to maintain said ingredients in liquid phase, for example, 100 to 125° C. Any suitable mixing times and temperatures can be employed. After mixing the composition can be poured into any suitable mold depending upon its intended use and then cured.

While the nitramine polyurethane compositions of the invention will cure at room temperature on standing, it is frequently desirable to include a curing catalyst in the composition. Suitable curing catalysts include metal complexes such as Ferrocene (dicyclopentadienyl iron), and 2,4-pentanedione complexes with cobalt, chromium, nickel or iron, ferric chloride, etc. Any suitable curing catalyst can be used in the practice of the invention and the invention is not limited to any specific curing catalyst. The amount of curing catalyst used, when used, will usually range from about 0.01 to 5 parts by weight per 100 parts by weight of the nitramine polyurethane. The actual curing temperatures and curing times employed will depend upon whether or not a catalyst is used, the amount of catalyst used, and the properties desired in the final nitramine polyurethane composition. The curing temperautre will generally be in the range between 70 and 250° F., preferably between 110 and 170° F. The curing time will range from 2 to 3 hours when the higher curing temperatures are employed, to about 7 days when curing is effected at the lower temperatures.

As mentioned above, the nitramine polyurethane compositions of the invention can be used as the binder component in the propellant compositions of the invention. When so used, said binder component comprises a nitramine polyurethane composition of the type hereinbefore described and, in addition, there may be present one or more plasticizers, wetting agents, antioxidants, and a curing catalyst. The finished binder frequently contains various compounding ingredients. Thus, it will be understood that herein and in the claims, unless otherwise specified, the term "binder" is employed generically and includes various conventional compounding ingredients. The binder content of the total propellant composition will depend somewhat upon the technique employed in forming said propellant composition into propellant grains. When it is desired to prepare castable propellant compositions, the binder content will usually range from about 20 to about 60 weight percent of the total composition. When techniques other than casting techniques, such as molding, are to be used the binder content of the propellant composition can range from about 10 to about 60 weight percent of the total composition.

A general formulation for the binder component of the propellant compositions of the invention is as follows:

| Ingredient: | Parts by weight |
| --- | --- |
| Nitramine polyurethane | 100 |
| Plasticizer | 0–250 |
| Antioxidant | 0–25 |
| Wetting agent | 0–25 |
| Curing catalyst | 0–5 |
| Casting aid | 0–5 |

A more preferred formulation for the binder component of the propellant compositions of the invention is as follows:

| Ingredient: | Parts by weight |
| --- | --- |
| Nitramine polyurethane | 100 |
| Plasticizer | 25–250 |
| Antioxidant | 0–25 |
| Wetting agent | 0–25 |
| Curing catalyst | 0.1–5 |
| Casting aid | 0–5 |

In general, any rubber plasticizer which is compatible with the nitramine polyurethanes of the invention can be used in said binder compositions. Materials which provide rubber having good low temperature properties are usually preferred.

As an added feature of the invention we have discovered that nitro substituted organic compounds are particularly valuable as plasticizers because they are high energy plasticizers, i.e., they make a contribution to the combustion processes themselves due to the oxygen and nitrogen contained therein. We have discovered a group of high energy plasticizers which are eminently suitable for use in high energy propellant compositions of the type disclosed and claimed herein. The high energy plasticizers of the invention are the dinitro and trinitro substituted paraffinic, and aromatic hydrocarbons containing from 2 to 6 carbon atoms per molecule, not more than one halogen atom per molecule, and wherein the carbon atoms to which said such substituents are attached are free of hydrogen atoms, and said halogen atom is selected from the group consisting of chlorine, bromine, and iodine.

Examples of said high energy plasticizers include, among others, the following:

1,1,1-trinitroethane;
2,3,3-trinitro-2-methylbutane;
2,2,3-trinitro-3-chlorobutane;
1,1-dinitro-1-chlorobutane;
1,1,1-trinitropropane;
1-bromo-2,2-dinitro-3,3-dimethylbutane;
1-iodo-2,3-dinitro-2,3-dimethylbutane;
1,1,1-trinitrohexane;
2,2-dinitropropane; and
1-chloro-2,4-dinitrobenzene.

Mixtures of said plasticizers can also be used in the practice of the invention. A mixture of 2,2-dinitropropane and 1-chloro-2,4-dinitrobenzene is a presently preferred plasticizer.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants which can be used include catalin antioxidant CaO-6 [bis(2-hydroxy-3-tertiary butyl-5-methylphenyl)sulfide] and 2,2-methylene-bis(4-methyl-6-tert-butylphenol); and the like.

While the propellant compositions of the invention will cure at ordinary room temperatures on standing, it is sometimes desirable to use curing catalysts and elevated temperatures so as to alter the curing time and the properties of the finished propellant. Suitable curing catalysts include among others, metal complexes such as Ferrocene (dicyclopentadienyl iron) or 2,4-pentanedione complexes with cobalt, chromium, nickel or iron. The amount of curing catalyst, when used, will generally range from 0.01 to 5 parts by weight per 100 parts by weight of the nitramine polyurethane.

The curing temperature will be limited by the oxidant employed in some cases but will generally be in the range between 70 and 250° F., preferably between 140 and 200° F.

The curing time must be long enough to give required creep resistance and other mechanical properties in the propellant. The time will generally range from around two or three hours when the higher curing temperatures are employed to about seven days when curing is effected at lower temperatures.

Oxidants which are applicable in the solid propellant compositions of this invention are those oxygen-containing solids which readily give up oxygen and include, for example, ammonium, alkali metal, and alkaline earth metal salts of nitric and perchloric acids, and mixtures thereof. Ammonium nitrate and ammonium perchlorate are the preferred oxidizers for use in the solid propellants of this invention. Other specific oxidizers include sodium nitrate, potassium perchlorate, calcium nitrate, and barium perchlorate. Mixtures of oxidizers are also applicable. In the preparation of the solid rocket propellant compositions, the oxidizers are ground to a particle size, preferably within the range between 2 and 300 microns average particle size. The most preferred particle size is from 10–220 microns. The amount of solid oxidizer can be a major amount of the total propellant comopsition and is generally in the range between 40 and 90 percent by weight of the total propellant composition. In the castable propellant compositions of the invention the oxidizer content ranges from 40 to 80 weight percent of the total propellant composition.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferroxyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, is usually in the range of 0 to 10 weight percent based on the total propellant composition.

Casting aids such as Kel-F Oil No. 1 (polytrifluorochloroethylene) can also be included in the propellant compositions when desired.

It is to be understood that each of the various types of compounding ingredients can be used singly, or mixtures of various ingredients performing a certain function can be employed. It is sometimes preferred, for example, to use mixtures of plasticizers rather than a single material.

It is also within the scope of the invention to include high energy additives such as finely divided aluminum, magnesium, boron and other finely divided metals in the propellant compositions of the invention. Said finely divided high energy additives will usually have a particle size within the range of 1 to 50 microns and will usually be used in amounts within the range of 0 to 30 weight percent based on the total propellant composition.

A general formulation for the propellant compositions of the invention is as follows:

|  | Parts by weight | Weight percent |
|---|---|---|
| Binder | | 10-60 |
| Nitramine polyurethane | 100 | |
| Plasticizer | 0-250 | |
| Antioxidant | 0-25 | |
| Wetting agent | 0-25 | |
| Curing catalyst | 0-5 | |
| Casting aid | 0-5 | |
| Oxidizer | | 90-40 |
| High energy additive | | 0-30 |
| Burning rate catalyst | | 0-10 |

The various ingredients in the propellant compositions of the invention can be mixed in any suitable manner using any suitable type of mixing equipment. For example, a Baker-Perkins dispersion blade mixer or a Reed Company standard sigma blade mixer can be used. In the final propellant composition the binder component forms a continuous phase with the oxidizer component being a discontinuous phase. The various ingredients of the propellant composition can all be mixed together in one step if desired. However, in a presently preferred mixing procedure the nitramine diol, the crosslinking agent being used (if one is used), and the plasticizer being used (if one is used) are placed in a suitable mixer, and the temperature is adjusted so that these ingredients are all in the liquid phase during initial mixing. This temperature is maintained throughout the remainder of the mixing procedure. The crystalline oxidizer is then added, along with any other solid ingredients, preferably in increments. Mixing is then continued for 5 to 15 minutes until a homogeneous mixture is obtained. The polyisocyanate and the cure catalyst (if one is used) are then added and mixing is continued until a homogeneous slurry or mixture is again obtained. Mixing temperatures are in the order of 60 to about 125° C. Any suitable mixing temperatures can be employed. Likewise, any suitable period of time sufficient to obtain the desired uniform mixing can be employed. Obviously the mixing times will depend somewhat upon the quantities being mixed, rate of stirring, etc.

Upon completion of the mixing, the finished propellant is poured into a mold for molding into finished propellant grains. If desired, the mold can be vibrated to insure proper flow and settling of the propellant composition within the mold, and to release any air which may have been entrapped during the mixing and casting process. The cast propellant grain in the mold is then cured by maintaining the mold at the required curing temperature within the temperature and time limits set forth above. Upon completion of the curing the finished grain is removed from the mold.

When it is desired to prepare the propellant grains by techniques other than casting, such as compression molding, the amount of plasticizer used in the propellant composition is decreased in order to reduce the fluidity of said composition. In such instances, upon completion of the mixing step, the propellant composition is transferred to the mold and compressed to the desired shape under the desired pressure according to conventional techniques known to those skilled in the art.

The following examples will serve to further illustrate the invention.

*Example I*

A nitramine polyurethane is prepared by mixing 61.1 grams of GSXEG, 36.4 grams of toluene diisocyanate, and 2.5 grams of trimethylol propane in a stirred reaction vessel. After thorough mixing at a temperature of about 80° C. the reaction mixture is poured from the reaction vessel into a mold and cured at 160° F. for three days.

A second nitramine polyurethane is prepared by mixing 62.8 grams of GSXEG and 37.2 grams of toluene diisocyanate in the same manner as described above for the first nitramine polyurethane. After curing, both of said nitramine polyurethanes were tough, resilient, rubber-like products.

*Example II*

Four propellant compositions A, B, C, and D were prepared using the above described preferred method of mixing the ingredients. The propellants were cured at 160° F. for three days. The composition of said propellants is set forth in the following Table III.

TABLE III

| Ingredient | Composition in weight percent | | | |
|---|---|---|---|---|
| | A | B | C | D |
| Ammonium Perchlorate [1] | 60.0 | 70.0 | 70.0 | 70.0 |
| GSXEG | 5.2 | 6.6 | 6.6 | 6.6 |
| TMP [2] | 0.5 | 0.27 | 0.27 | 0.27 |
| TDI [3] | 3.6 | 3.94 | 3.94 | 3.94 |
| DNCB [4] | 6.1 | 3.8 | 9.55 | 9.55 |
| 2,2-dinitropropane | 24.4 | 15.3 | 9.55 | 9.55 |
| FeAA [5] | 0.02 | 0.01 | 0.011 | 0.009 |

[1] A 70/30 ratio of 200 micron and 18 micron average particle size.
[2] 1,1,1-trimethylolpropane.
[3] Toluene-2,4-diisocyanate.
[4] 1-chloro-2,4-dinitrobenzene.
[5] Ferric acetonylacetonate.

Two samples approximately 0.25 inch square and 0.5 inch long were cut from propellant C and each was restricted on all sides except one end with Epon adhesive. Burning rates on each of the two samples were obtained by using the optical strand bomb method as follows: each of the samples was placed in a bomb at room temperature (20–25° C.) and under different nitrogen pressures covering the range from 300 to 1200 p.s.i.g. Burning of the sample was initiated by means of an igniter wire. Burning was indicated by an optical system comprising a lead sulfide cell in one arm of a Wheatstone bridge. As the propellant burned, the rays emitted passed through a quartz window in the bomb and onto said lead sulfide cell. A recording was made of the infra-red intensity registered by said lead sulfide cell as a function of time. This recording clearly indicated the duration of the burning and was used to compute the burning rate. Graphs were made of the burning rate, $r$, versus pressure and a smooth curve drawn to represent the results and to obtain the burning rate at 1000 p.s.i. These results, together with the pressure exponent, $n$, of the burning rate equation, $r = k(p_c)^n$ where $r$ is the burning rate in inches per second; $p_c$ is the combustion chamber pressure in pounds per square inch; $k$ is a constant which varies with the ambient grain temperature; and $n$ is a constant known as the burning rate exponent.

| Sample No. | Burning rate, $r$ at 1,000 p.s.i. | $n$ |
|---|---|---|
| 1 | 0.41 | 0.41 |
| 2 | 0.43 | 0.44 |

The following physical properties were obtained upon a sample of propellant C.

TABLE IV

| Temp., °F. | $S_m$, p.s.i. | $S_b$, p.s.i. | $E_m$, Percent | $E_b$, Percent | Modulus of Elasticity |
|---|---|---|---|---|---|
| 170 | 47 | 45 | 16.1 | 17.4 | 371 |
| 70 | 101 | 86 | 28.9 | 35.9 | 431 |
| 0 | 1,103 | 1,063 | 3.1 | 2.8 | 55,600 |
| −40 | 1,483 | | 0.9 | | 144,500 |

$S_m$=max. tensile; $S_b$=tensile at break; $E_m$=max. elongation; $E_b$=elongation at break; modulus=S/E at origin.

Example III

Castable nitramine propellants containing aluminum (Reynolds 1-511) or boron were prepared using the above described preferred mixing method. The propellants were cured at 160° F. for three days. The compositions of said propellants, designated E, F, G, and H, are set forth in the following table.

TABLE V

| Ingredient | E | F | G | H |
|---|---|---|---|---|
| Ammonium Perchlorate [1] | 70.0 | 67.0 | 67.0 | 67.0 |
| GSXEG | 6.6 | 6.16 | 6.16 | 6.6 |
| TMP [2] | 0.27 | 0.25 | 0.25 | 0.27 |
| TDI [3] | 3.94 | 3.68 | 3.68 | 3.94 |
| CDNB [4] | 3.82 | 8.9 | 3.6 | 3.82 |
| 2,2-dinitropropane | 15.28 | 8.9 | 14.2 | 15.28 |
| FEAA | 0.009 | 0.008 | 0.008 | 0.009 |
| Aluminum Powder [5] | | 5.0 | 5.0 | |
| Boron Powder [6] | | | | 3 |

[1] A 70/30 ratio of 200 micron and 18 micron average particle size.
[2] 1,1,1-trimethylolpropane.
[3] Toluene-2,4-diisocyanate.
[4] 1-chloro-2,4-dinitrobenzene.
[5] Reynolds 1-511.
[6] HPA boron, 1 micron size.

Burning rates on said propellants E, F, G, and H were obtained by the optical strand bomb method described above. The results of said burning rate tests are set forth in the table below.

TABLE VI

| Propellant | Burning Rate at 1,000 p.s.i.: in./sec. | Pressure Exponent | Temperature Sensitivity $\pi p$ (percent/° F.) | |
|---|---|---|---|---|
| | | | 70° F. to 170° F. | −40° F. to 70° F. |
| E | 0.513 | 0.54 | 0.13 | 0.13 |
| F | 0.401 | 0.44 | | |
| G | 0.425 | 0.48 | | |
| H | 0.615 | 0.33 | 0.14 | 0.20 |

Temperature sensitivity is determined by determining the burning rate at different temperatures over a given range and at a given constant pressure. Said temperature sensitivity can be computed from the equation $$\pi p = \frac{\left(\ln \frac{r_1}{r_2}\right) 100}{T_1 - T_2}$$

wherein $r_1$ and $r_2$ are the burning rates at temperatures $T_1$ and $T_2$, respectively. Said temperatures are expressed in degrees Fahrenheit and $T_1$ is greater than $T_2$. Thus, the units for $\pi p$ are in percent per degree Fahrenheit.

While certain examples have been set forth above for purposes of illustration the invention is not limited thereto. Various other modifications of the invention will be apparent to those skilled in the art in view of this disclosure. Such modifications are within the spirit and scope of the invention.

We claim:

1. A composition of matter comprising the reaction product of a polyisocyanate substituted hydrocarbon and 3,11-dioxa-5,7,9-trinitrazatridecane-1,13-diol.

2. A nitramine polyurethane composition of matter prepared by the reaction of a polyisocyanate substituted hydrocarbon with 3,11-dioxa-5,7,9-trinitrazatridecane-1,13-diol, said polyisocyanate substituted hydrocarbon being reacted with said diol in an amount of from about 0.9 to about 1.8 chemical equivalents based on isocyanate groups therein per chemical equivalent of said diol based on hydroxyl groups therein.

3. A nitramine polyurethane composition of matter prepared by the interaction of a polyisocyanate substituted hydrocarbon with (a) 3,11-dioxa-5,7,9-trinitrazatridecane-1,13-diol and (b) a polyhydroxy compound selected from the group of primary and secondary polyhydroxy compounds characterized by the formula $R(OH)_n$ where R is a saturated acyclic hydrocarbon radical having from 3 to 6 carbon atoms wherein only one OH group is attached to any one carbon atom and $n$ is an integer of from 3 to 6.

4. A composition of matter according to claim 3 wherein said reactants are present in the following amounts

|  | Chemical equivalents |
|---|---|
| Diol | 1 (based on hydroxyl groups). |
| Polyisocyanate substituted hydrocarbon | 0.9–1.8 (based on isocyanate groups). |
| Polyhydroxy compound | 0.1–0.6 (based on hydroxyl groups). |

5. A composition of matter according to claim 4 wherein said polyisocyanate substituted hydrocarbon is a toluene diisocyanate and said polyhydroxy compound is 1,1,1-trimethylolpropane.

6. A composition of matter comprising the reaction product of 3,11-dioxa-5,7,9-trinitrazatridecane-1,13-diol with an organic polyisocyanate selected from the group consisting of toluene-2,4-diisocyanate; toluene-2,3-diisocyanate; toluene-2,5-diisocyanate; toluene-2,6-diisocyanate; commercial mixtures of 2,4- and 2,6-toluene diisocyanate; 1,6-hexamethylene diisocyanate; triphenylmethane triisocyanate; 1,5-decamethylene diisocyanate; cyclopentylene-1,3-diisocyanate; cyclohexylene-1,3-diisocyanate; diphenyl-4,4'-diisocyanate; diphenyl-3,3'-diisocyanate; benzene-1,3-diisocyanate; benzene-1,4-diisocyanate; benzene-1,2,4-triisocyanate; toluene-2,4,6-triisocyanate; benzene-1,3,5-triisocyanate; benzene-1,2,3-triisocyanate; toluene-2,3,4-triisocyanate; and polybenzylene polyisocyanate.

7. A process for preparing a nitramine polyurethane composition of matter, which process comprises reacting a polyisocyanate substituted hydrocarbon with 3,11-dioxa-5,7,9-trinitrazatridecane-1,13-diol.

8. A process for preparing a nitramine polyurethane composition of matter, which process comprises reacting 3,11-dioxa-5,7,9-trinitrazatridecane-1,13-diol with an organic polyisocyanate selected from the group consisting of toluene-2,4-diisocyanate; toluene-2,3-diisocyanate; toluene-2,5-diisocyanate; toluene-2,6-diisocyanate; commercial mixtures of 2,4- and 2,6-toluene diisocyanate; 1,6-hexamethylene diisocyanate; triphenylmethane triisocyanate; 1,5-decamethylene diisocyanate; cyclopentylene-1,3-diisocyanate; cyclohexylene-1,3-diisocyanate; diphenyl-4,4'-diisocyanate; diphenyl-3,3'-diisocyanate; benzene-1,3-diisocyanate; benzene-1,4-diisocyanate; benzene-1,2,4-triisocyanate; toluene-2,4,6-triisocyanate; benzene-1,3,5-triisocyanate; benzene-1,2,3-triisocyanate; toluene-2,3,4-triisocyanate; and polybenzylene polyisocyanate.

9. A nitramine polyurethane composition of matter prepared by the interaction of an organic polyisocyanate selected from the group consisting of toluene-2,3-diisocyanate; toluene-2,3-diisocyanate; toluene-2,5-diisocyanate; toluene-2,6-diisocyanate; commercial mixtures of 2,4- and 2,6-toluene diisocyanate; 1,6-hexamethylene diisocyanate; triphenylmethane triisocyanate; 1,5-decamethylene diisocyanate; cyclopentylene-1,3-diisocyanate; cyclohexylene-1,3-diisocyanate; diphenyl-4,4'-diisocyanate; diphenyl-3,3'-diisocyanate; benzene-1,3-diisocyanate; benzene-1,4-diisocyanate; benzene-1,2,4-triisocyanate; toluene-2,4,6-triisocyanate; benzene-1,3,5-triisocyanate; benzene-1,2,3-triisocyanate; toluene-2,3,4-triisocyanate; and polybenzylene polyisocyanate with (a) 3,11-dioxa-5,7,9-trinitrazatridecane-1,13-diol and (b) a polyhydroxy compound selected from the group consisting of 1,2,3-propanetriol, 1,26-hexanetriol, 1,1,1-trimethylolpropane, erythritol, pentaerythritol, ribitol, xylitol, sorbitol, and mannitol; said reactants being present in the following amounts

| | Chemical equivalents |
|---|---|
| Diol | 1 (based on hydroxyl groups). |
| Polyisocyanate | 0.9–1.8 (based on isocyanate groups). |
| Polyhydroxy compound | 0.1–0.6 (based on hydroxyl groups). |

References Cited by the Examiner

UNITED STATES PATENTS

| | | | |
|---|---|---|---|
| 2,597,025 | 5/1952 | Orth | 260—77.5 |
| 2,692,874 | 10/1954 | Langerak | 260—77.5 |
| 2,740,702 | 4/1956 | Mace | 52—0.5 |
| 2,744,816 | 5/1956 | Hutchison | 52—0.5 |
| 2,929,800 | 3/1960 | Hill | 260—77.5 |
| 3,121,748 | 2/1964 | Gey | 260—77.5 |

LEON J. BERCOVITZ, *Primary Examiner.*

L. D. ROSDOL, R. L. CAMPBELL, *Examiners.*